(12) United States Patent
Takagi et al.

(10) Patent No.: US 8,417,086 B2
(45) Date of Patent: Apr. 9, 2013

(54) DATA RECORDING APPARATUS, DATA TRANSFER METHOD, DATA TRANSFER PROGRAM AND RECORDING MEDIUM, AND DATA TRANSFER SYSTEM

(75) Inventors: Hiroshi Takagi, Saitama (JP); Junji Oiwa, Kanagawa (JP)

(73) Assignee: Sony Corporation (JP)

( * ) Notice: Subject to any disclaimer, the term of this patent is extended or adjusted under 35 U.S.C. 154(b) by 1040 days.

(21) Appl. No.: 11/010,601

(22) Filed: Dec. 13, 2004

(65) Prior Publication Data

US 2005/0163467 A1 Jul. 28, 2005

(30) Foreign Application Priority Data

Dec. 12, 2003 (JP) ................ P2003-414658

(51) Int. Cl.
*H04N 5/765* (2006.01)
*H04N 5/931* (2006.01)
(52) U.S. Cl. ................ 386/200; 386/204
(58) Field of Classification Search .......... 386/46
See application file for complete search history.

(56) References Cited

U.S. PATENT DOCUMENTS

| | | | | |
|---|---|---|---|---|
| 7,383,356 B2 * | 6/2008 | Gargi | .......... | 709/246 |
| 2001/0039656 A1 * | 11/2001 | Nakamura et al. | .......... | 725/9 |
| 2003/0133032 A1 * | 7/2003 | Aoki et al. | .......... | 348/333.05 |
| 2004/0086269 A1 * | 5/2004 | Huang | .......... | 386/125 |
| 2004/0143622 A1 * | 7/2004 | Hirabayashi et al. | .......... | 709/200 |
| 2004/0174934 A1 * | 9/2004 | Komi et al. | .......... | 375/240.18 |

FOREIGN PATENT DOCUMENTS

| | | |
|---|---|---|
| JP | 2001-169250 A | 6/2001 |
| JP | 2002-208983 A | 7/2002 |
| JP | 2002-271744 A | 9/2002 |
| JP | 2003-111023 A | 4/2003 |
| JP | 2003-224813 A | 8/2003 |

\* cited by examiner

*Primary Examiner* — William C Vaughn, Jr.
*Assistant Examiner* — Oluwaseun A Adegeye
(74) *Attorney, Agent, or Firm* — Lerner, David, Littenberg, Krumholz & Mentlik, LLP

(57) ABSTRACT

While viewing and listening to AV data, other AV data is converted and transferred to a reproducing terminal. A recorder has two decoding parts as a decoding unit of AV data on a recording medium. AV data which was decoded in one of the decoding parts is supplied to a monitor device. When there is a transfer request for AV data, in accordance with a schedule which is formulated based on a transfer request list and a programmed picture recording list, AV data in the transfer request list is decoded in the other one of the decoding parts, encoded in an encoding part, converted into new AV data, and recorded in the recording medium. When a connection to the reproducing terminal is detected, the new AV data on the recording medium is transferred to the reproducing terminal. Since it has two decoding parts, it is possible to convert other AV data into new AV data while viewing and listening to AV data on the monitor device.

27 Claims, 9 Drawing Sheets

FIG. 4

| ID | PREFERENCE LEVEL | ALREADY CONVERTED FLAG |
|---|---|---|
| 00005 | 2 | 0 |
| 00020 | 7 | 0 |
| 00007 | 3 | 0 |

FIG. 5

| ID | PREFERENCE LEVEL | ALREADY CONVERTED FLAG |
|---|---|---|
| 00114 | 5 | 0 |
| 03521 | 8 | 0 |

FIG. 6

| ID | PREFERENCE LEVEL | ALREADY CONVERTED FLAG |
|---|---|---|
| 00020 | 7 | 0 |
| 00007 | 3 | 0 |
| 00005 | 2 | 0 |
| 03521 | 8 | 0 |
| 00114 | 5 | 0 |

FIG. 8

| PROGRAM 1 | START TIME $T_{b1}$ | ENDING TIME $T_{e1}$ |
|---|---|---|
| PROGRAM 2 | START TIME $T_{b2}$ | ENDING TIME $T_{e2}$ |
| ⋮ | ⋮ | ⋮ |
| PROGRAM m | START TIME $T_{bm}$ | ENDING TIME $T_{em}$ |

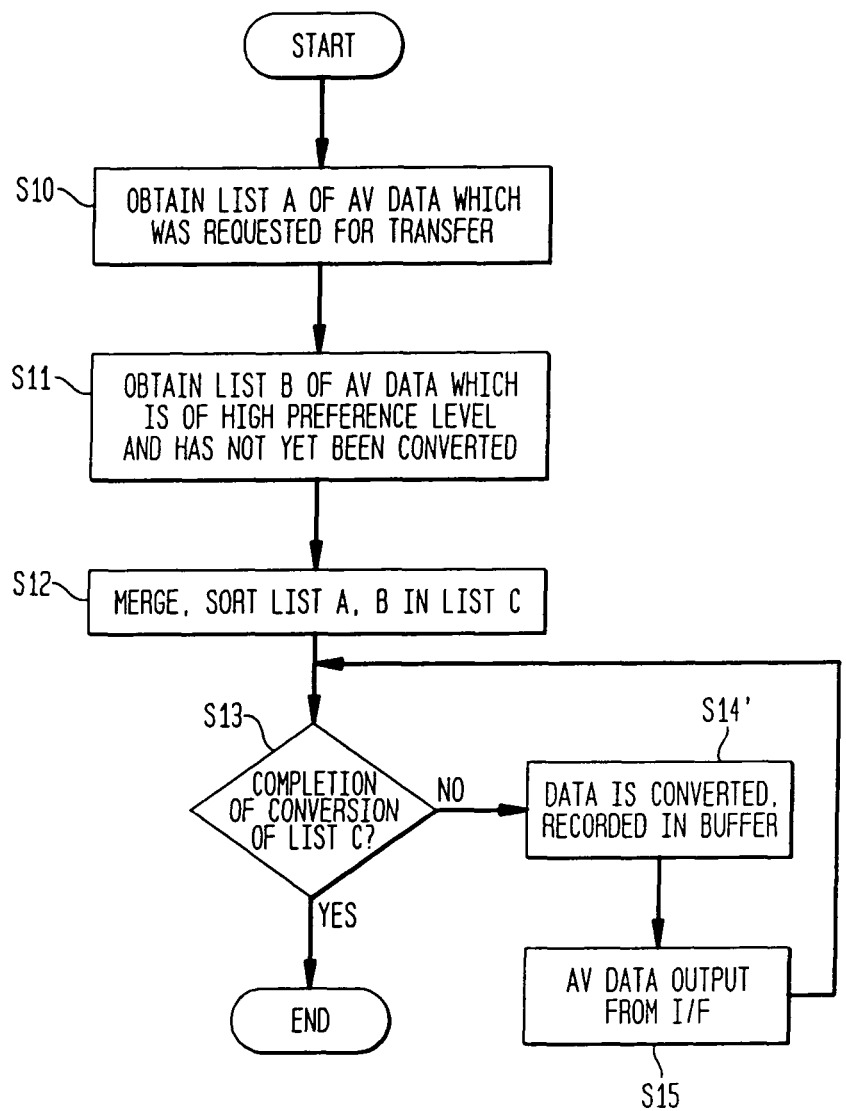

DATA RECORDING APPARATUS, DATA TRANSFER METHOD, DATA TRANSFER PROGRAM AND RECORDING MEDIUM, AND DATA TRANSFER SYSTEM

CROSS-REFERENCE TO RELATED APPLICATIONS

The present application claims priority from Japanese Application No. 2003-414658 filed Dec. 12, 2003, the disclosure of which is hereby incorporated by reference herein.

BACKGROUND OF THE INVENTION

This invention relates to a data recording apparatus, a data transfer method, a data transfer program and a recording medium, and a data transfer system, all of which are configured so as to transfer data stored in a recording medium to other equipment.

Since a long time ago, there has existed a video recorder configured so as to record video data and audio data (hereinafter, called AV (Audio/Video) data) on the basis of television broadcasts, etc., in a hard disk drive (HDD). In such video recorder, for example, analog video/audio signals output from a tuner are converted into digital video/audio signals, compression encode processing is applied thereto by use of a predetermined system, and thereafter, they are recorded in an HDD. As a compression encoding system, for example, MPEG2 (Moving Picture Experts Group 2) may be used.

In addition, in digital television broadcasting for which real broadcasting has started recently, AV data is converted into an MPEG TS (Transport Stream) format to be transmitted. In this case, it is possible to record the received MPEG TS format data in an HDD, without change. In case the AV data, which was recorded in an HDD, is further recorded in a DVD (Digital Versatile Disk) configured so as to be recordable, it is preferable if the MPEG TS format data is converted into an MPEG PS format which can be reproduced by a DVD player. Japanese Published Application No. JP-A-2003-111023 describes such a configuration in which the MPEG TS format data is converted into the MPEG PS format data as it is recorded in a recording medium.

In recent years, information equipment has been developed in which a recording medium, such as a relatively high-capacity memory and a small size HDD, a display which can display color, an audio output unit and so on are incorporated in a housing reduced in size and weight so as to be easily portable, and AV data, which was stored in the memory, is reproduced such that video pictures are imaged on a display and audio is output. Examples of such equipment are a PDA (Personal Digital Assistant) and a portable telephone terminal.

With respect to such information equipment, in addition to its primary usage as information equipment, it conceivably may be used as a reproducing terminal apparatus in which AV data of day-old television broadcasts, etc. are stored in a recording medium in advance, and are viewed and listened to when commuting, when a destination has been reached and so on. For example, television broadcasts may be picture-recorded by a video recorder as described above, and the picture-recorded AV data may be transferred in advance to this information equipment. Hereinafter, such information equipment is referred to as a reproducing terminal apparatus.

In such reproducing terminal apparatus, there are limitations in the memory capacity and the capability of decoding video data. Accordingly, when transferring AV data from a video recorder to a reproducing terminal apparatus, it may be necessary to convert the compression encoding system of the AV data into a compression encoding system with a lower bit rate and a compression encoding system by which it is easier to carry out decoding.

In the meantime, a video recorder using conventional technology as described above has not been configured so as to convert AV data other than the AV data currently being listened to and viewed. Accordingly, when transferring AV data, which is different from the AV data which is currently being viewed and listened to, to a reproducing terminal apparatus, there has been a problem that viewing and listening to the current AV data is terminated, or a user has viewing and listening to the current AV data terminated, and then the transfer of the other AV data will be carried out. That is, in the conventional art, there has been a problem that it is necessary for a user to set aside time purposely in order to carry out the transfer of AV data to a reproducing terminal apparatus. This becomes a problem, in particular, when a tremendous amount of time is required for conversion of AV data.

In addition, according to the conventional art, it has been necessary for a user to designate the AV data to be transferred when transferring the AV data to a reproducing terminal apparatus. Accordingly, when viewing and listening to AV data which was transferred from a video recorder to a reproducing terminal apparatus at, for example, a user's destination, there has been a problem that the AV data which can be viewed and listened to is limited, and there is little flexibility.

SUMMARY OF THE INVENTION

It is an object of the invention to provide a data recording apparatus, a data transfer method, a data transfer system, and a recording medium recorded with a program for executing a data transfer method, which can convert AV data into other AV data while viewing and listening to the AV data, and transfer it to a reproducing terminal apparatus.

In addition, it is another object of the invention to provide a data recording apparatus, a data transfer method, a data transfer system, and a recording medium recorded with a program for executing a data transfer method, which are configured to transfer AV data designated by a user, and to transfer AV data not designated by a user, arbitrarily.

One aspect of the invention provides a data recording apparatus configured to transfer AV data recorded in a recording medium to another apparatus, the data recording apparatus having first and second decoding units operable to decode AV data read out from the recording medium; an encoding unit operable to encode the AV data decoded by the second decoding unit; and a communication unit operable to transfer the encoded AV data to the another apparatus.

Another aspect of the invention provides a method for transferring AV data recorded in a recording medium to another apparatus, the method including reading out first AV data from a recording medium and decoding the read out first AV data using a first decoding unit; reading out second AV data from the recording medium and decoding the read out second AV data using a second decoding unit; encoding the AV data decoded by the second decoding unit; and transferring the encoded AV data to the another apparatus.

A further aspect of the invention provides a system for transferring AV data recorded in a recording medium to another apparatus, the system including a processor operable to execute instructions and instructions for causing the processor to perform a data transfer method, the data transfer method including reading out first AV data from a recording medium and decoding the read out first AV data using a first decoding unit; reading out second AV data from the recording medium and decoding the read out second AV data using a second decoding unit; encoding the AV data decoded by the second decoding unit; and transferring the encoded AV data to the another apparatus.

In addition, a still further aspect of the invention provides a recording medium recorded with a program for causing a computer to execute a method for transferring AV data recorded in a recording medium to another apparatus. The method includes reading out first AV data from a recording medium and decoding the read out first AV data using a first decoding unit; reading out AV second data from the recording medium and decoding the read out second AV data using a second decoding unit; encoding the AV data decoded by the second decoding unit; and transferring the encoded AV data to the another apparatus.

Yet a further aspect of the invention provides a system for transferring AV data recorded in a recording medium to another apparatus, the system including a data recording apparatus and a data reproducing apparatus. The data recording apparatus has first and second decoding units operable to decode AV data read out from the recording medium, an encoding unit operable to encode the AV data decoded by the second decoding unit, and a first communication unit operable to carry out communication with another apparatus. The data reproducing apparatus has a second communication unit operable to communicate with the first communication unit, a storage unit operable to store AV data, and a third decoding unit operable to decode AV data read out from the storage unit. The first communication unit of the data recording apparatus transfers the encoded AV data to the data reproducing apparatus, and the second communication unit of the data reproducing apparatus receives the transferred AV data and stores the transferred AV data in the storage unit.

As described above, the invention has the two systems of the first decoding unit and the second decoding unit which decode AV data read out from the recording medium, encodes the AV data decoded by the second decoding unit and transfers the encoded AV data to another apparatus. Therefore, it is possible to decode AV data recorded in the recording medium using the second decoding unit, and to transfer the AV data decoded by the second decoding unit and then further encoded, to another apparatus, while viewing and listening to AV data recorded in the recording medium and decoded using the first encoding unit.

In addition, the invention decodes AV data read out from the recording medium using the first decoding unit, and decodes AV data read out from the recording medium using the second decoding unit, and is configured so that the AV data decoded by the second decoding unit is encoded, and then transferred to another apparatus. Therefore, it is possible to have a computer apparatus execute decoding of AV data recorded in the recording medium using the second decoding unit, and transfer the AV data decoded by the second decoding unit and then further encoded, to another apparatus while viewing and listening to AV data recorded in the recording medium and decoded using the first encoding unit.

In addition, the invention includes the data recording apparatus having the two systems of the first decoding unit and the second decoding unit which decode AV data read out from the recording medium, which encodes the AV data decoded by the second decoding unit, and which transfers the encoded AV data to the data reproducing apparatus by the first communication unit; and the data reproducing apparatus having the second communication unit which is operable to communicate with the first communication unit, and which is configured to decode AV data read out from the storage unit using the third decoding unit. Further, the data recording apparatus is configured to transfer the encoded AV data to the data reproducing apparatus, and the second communication unit of the data reproducing apparatus is configured to receive the transferred AV data unit and to store the transferred AV data in the storage unit. Therefore, in the data recording apparatus, it is possible to decode AV data recorded in the recording medium using the second decoding unit, and to transfer the AV data decoded by the second decoding unit and then further encoded, to the data reproducing apparatus; and in the data reproducing apparatus, it is possible to read out the AV data, transferred from the data recording apparatus, from the storage unit, to decode it, and to listen to and view it.

The invention has two systems of decoding parts which decode AV data reproduced from the recording medium, and further has an encoding part which again encodes the AV data decoded by one of the decoding part systems. Accordingly, there is an advantage that it is possible to convert AV data recorded in the recording medium for the purpose of transferring it to another apparatus, while viewing and listening to AV data reproduced from the recording medium.

In addition, since it is possible to decode AV data which was reproduced from the recording medium, and to further encode it, there is an advantage that it is possible to transfer the AV data by connecting equipment with different formats of AV data which can be reproduced and different recording bit rates.

Further, the invention is configured so as to convert AV data selected on the basis of a preference level, in addition to AV data designated by a user, when carrying out conversion processing for the purpose of transferring the AV data recorded in the recording medium to another apparatus. Accordingly, it saves the user the trouble of selecting and designating AV data.

Furthermore, in one embodiment of the invention, the conversion processing of AV data for the purpose of transferring it to another apparatus is designed to be carried out during a time period in which programmed recording is not scheduled, and therefore, it is possible to disperse accesses to the recording medium, and there is an advantage that it is possible to lighten the burden on the recording medium.

In addition, in one embodiment the invention is configured so that AV data to be transferred is converted in advance and recorded in the recording medium, and after it is detected that an apparatus at the transfer destination is connected, the converted AV data is transferred. Accordingly, even if the bit rate of the converted AV data is greater than the bit rate of a digital interface which is used for transfer, there is an advantage that the transfer of the converted AV data is possible.

BRIEF DESCRIPTION OF THE DRAWINGS

The invention, together with further advantages thereof, may best be understood by reference to the following description taken in conjunction with the accompanying drawings in which:

FIG. 4 is a schematic diagram which shows one example list of AV data for which transfer was requested by a user;

FIG. 5 is a schematic diagram which shows one example list of AV data which is of a high preference level, and of non-conversion;

FIG. 6 is a schematic diagram which shows one example list of AV data to be converted;

FIG. 8 is a schematic diagram which shows one example of a picture recording program list Lrsv;

FIG. 11 is a flow chart which shows one example of a process which carries out conversion and transfer of AV data according to this modified example of the embodiment.

DETAILED DESCRIPTION

Figure 1:
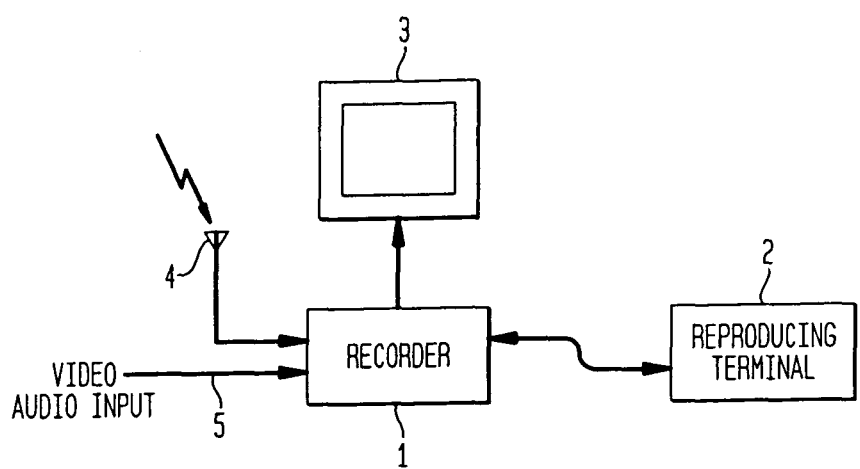
FIG. 1 is a block diagram which shows the configuration of one example of a data transfer system according to the invention.

Hereinafter, one embodiment of the invention will be described with reference to the drawings. FIG. 1 shows the configuration of one example of a data transfer system according to the invention. An MPEG TS in which AV data and broadcast data, compressed and encoded by an MPEG2 system, are multiplexed, is modulated and broadcast in a broadcasting station which is not shown in the figures. The broadcast data is meta data which is associated with and describes the broadcast content, such as EPG (Electronic Program Guide) data.

A video recorder 1 has a tuner and receives digital television broadcast signals broadcast from the broadcasting station through an antenna 4, demodulates the signals in the tuner, and outputs the demodulated signals as an MPEG TS in which AV data and broadcast data are multiplexed. This MPEG TS is recorded in a recording medium composed of, for example, a hard disk drive (HDD). In addition, broadcast data is taken out from the demodulated MPEG TS, and is stored in a recording medium and in a memory in the video recorder 1. At the time of reproduction, data recorded in the recording medium is decode processed in a predetermined manner, and is supplied to a monitor device 3.

Meanwhile, the video recorder 1 can encode process AV data which was input as an external input 5 in the same manner, and record it in a recording medium.

The video recorder 1 can encode process AV data which was recorded in the recording medium in the video recorder 1 using a system which corresponds to that used by a reproducing terminal apparatus 2, and can record it in a recording medium. The encode-processed AV data is scheduled in a predetermined manner, read out from the recording medium, and transferred to the reproducing terminal apparatus 2. The reproducing terminal apparatus 2 stores the transferred AV data in an internal storage medium. The stored AV data is reproduced for viewing on a display device and listening to through an audio output unit arbitrarily, in accordance with an operation of the reproducing terminal apparatus 2.

As the reproducing terminal apparatus 2, it is possible to employ a portable telephone terminal or a PDA having functions of storing and reproducing AV data, as described in the related art. It is also possible to employ a portable type data reproducing apparatus which is specially configured to reproduce AV data as the reproducing terminal apparatus 2. Further, the reproducing terminal apparatus 2 is not limited to only a portable type apparatus, but may also include a stationary type recording and reproducing apparatus which is mainly used indoors, like the video recorder 1, and in-car information equipment, such as a car navigation apparatus. Furthermore, the reproducing terminal apparatus 2 is not necessarily required to have a function of reproducing AV data, and may be, for example, an apparatus which stores AV data to a storage medium which is loaded and used in a device having a function of reproducing AV data.

Meanwhile, in the foregoing, it was described that the video recorder 1 receives digital television broadcast signals, but the invention is not limited to this example, and the video recorder 1 can also receive analog television broadcast signals. In this case, analog AV signals, which were demodulated from the received television broadcast signals, are A/D converted into AV data and recorded in a recording medium. In the same manner, it is also possible to input analog AV signals as the external input 5.

Figure 2:
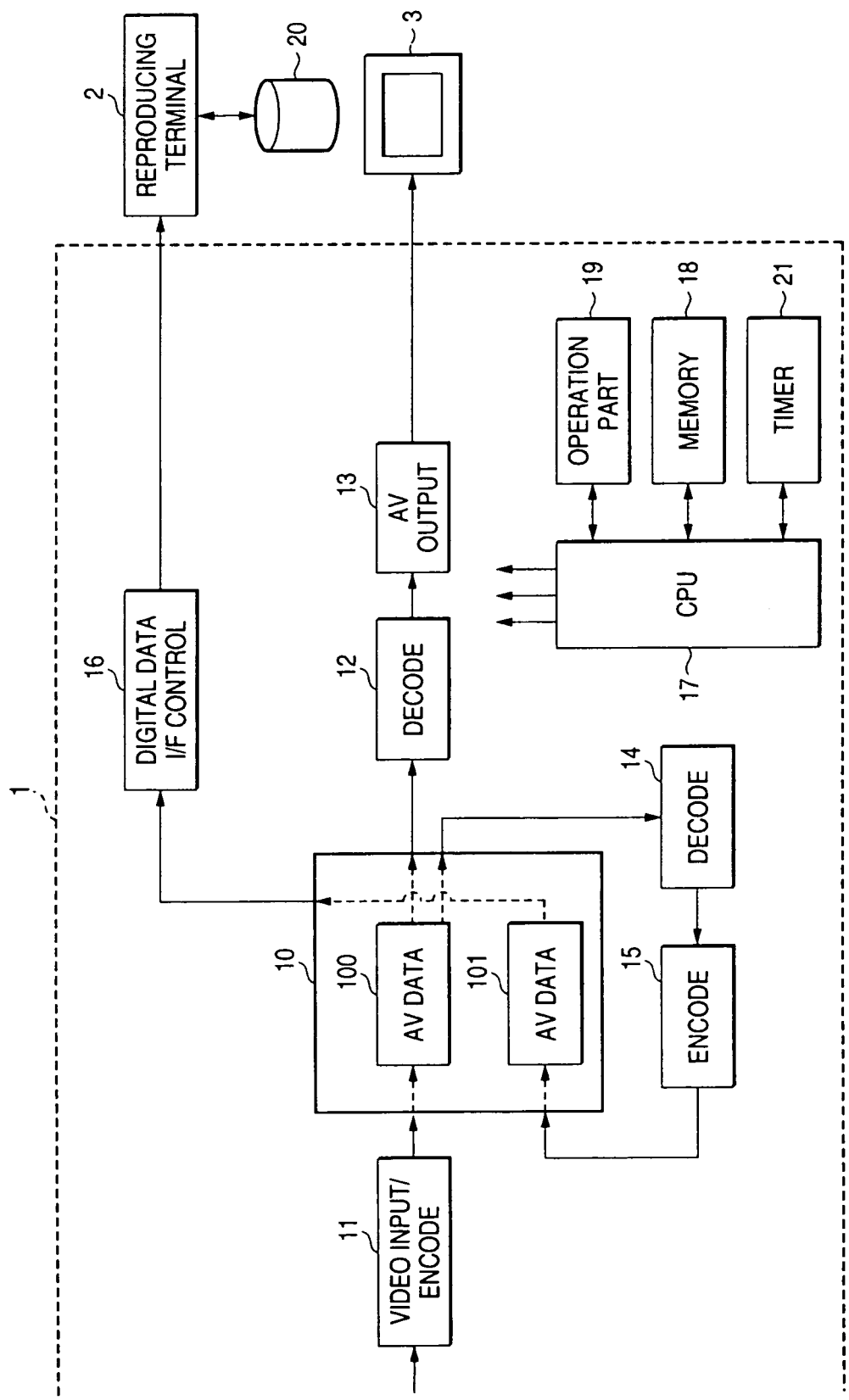
FIG. 2 is a block diagram which shows the configuration of one example of a video recorder according to one embodiment of the invention.

FIG. 2 shows the configuration of one example of the video recorder 1 according to this embodiment of the invention. An MPEG TS, in which the digital television broadcast signals are received by an antenna 4 and demodulated by a tuner part which is not shown in the figure, is input processed by a video input/encoding part 11 in a predetermined manner, and recorded in a recording medium 10 composed of, for example, a hard disk drive. A reception history of the tuner part, received by the tuner part and recorded in the recording medium, is recorded in the recording medium 10 as a history of viewing and listening. The history of viewing and listening is composed of, for example, channel selection information, time of viewing and listening information, and information which shows the presence or absence of a recording to the recording medium 10.

In addition, if analog video signals and analog audio signals are input through the external input 5, predetermined signal processing is applied thereto in the video input/encoding part 11, and the signals are encode processed to be converted into an MPEG TS which is recorded in the recording medium 10.

In the description that follows, audio data and video data which are included in an MPEG TS in which the digital television broadcast signals received by the antenna 4 were demodulated and recorded in the recording medium 10, are referred to as AV data 100. The AV data 100 corresponds to digital television broadcast signals recorded in a certain period of time, for example, such as one broadcast program. Meanwhile, it is also possible to treat AV data which was input from the external input 5 and recorded in the recording medium 10 as the AV data 100 in the same manner.

At the time of reproduction, in accordance with an operation by a user through a UI (User Interface) which will be described later, designated AV data 100 is read out from the recording medium 10 and supplied to the decoding part 12. The decoding part 12 decodes the supplied AV data 100 and outputs analog video signals and analog audio signals. The analog video/audio signals output from the decoding part 12 are supplied to an AV output part 13, signal processed in a predetermined manner, and supplied to a monitor device.

In this embodiment of the invention, an MPEG TS which was recorded in the recording medium 10 can also be supplied to a decoding part 14. The decoding part 14 decodes the supplied MPEG TS and outputs analog video signals and analog audio signals. The analog video/audio signals output from the decoding part 14 are supplied to an encoding part 15, encoded by use of a predetermined compression encoding system, and recorded in the recording medium 10. In what follows, data encoded by the encoding part 15 is referred to as AV data 101.

The encoding part 15 is designed to carry out encode processing, such as compression encoding, using a system that enables the encoded data to be decoded by the reproducing terminal apparatus 2. An encoding system to which the reproducing terminal apparatus 2 corresponds may be, for example, an MPEG4 system which is capable of realizing a higher compression rate than an MPEG1 system, and an MPEG2 system. In addition, it is conceivable that a system which is widely used in a computer apparatus, etc., such as QuickTime (Registered Trademark), also may be used. In this embodiment of the invention, the encoding system of the encoding part 15 is fixed so as to correspond to the system used by the reproducing terminal apparatus 2, which is assumed to be used by being connected to the video recorder 1. Not being limited only to this, it is possible to make the encoding system selectable in accordance with the reproducing terminal apparatus 2.

A digital data IF control part 16 carries out control of digital data transfer between the video recorder 1 and the reproducing terminal apparatus 2. The digital data IF control part 16 further has a function of detecting whether the reproducing terminal apparatus 2 is connected to the video recorder 1. For example, the digital data IF control part 16 tries to communicate with the reproducing terminal apparatus 2 at regular intervals, and if there is a response, it detects the connection of the reproducing terminal apparatus 2. Not being limited to this, detection may be carried out by trying to communicate with the reproducing terminal apparatus 2 based on an instruction from a CPU (Central Processing Unit) 17 which will be described later. If the video recorder 1 and the reproducing terminal apparatus 2 are connected through the digital data IF control part 16, it is possible to transfer the AV data 101, which was read out from the recording medium 10, to the reproducing terminal apparatus 2.

CPU 17 is connected to each part of the video recorder 1 through a bus, etc. which is not shown in the figures, and controls the entirety of the video recorder 1 on the basis of a predetermined program. A memory 18 is composed of a RAM (Random Access Memory) and a ROM (Read Only Memory), and the RAM is used as a work memory for the CPU 17. The ROM stores a program in advance which is used by the CPU 17 to control all of the operations of the video recorder 1. The video recorder 1 can be considered to be a kind of a computer apparatus since it is controlled entirely by the CPU 17 which operates in accordance with a program.

Meanwhile, it is possible to add a function and update an original program by writing a program and data obtained from the outside in a rewriteable ROM. For example, it is possible to rewrite a program by recording the program in a CD-ROM (Compact Disk-Read Only Memory) or a DVD (Digital Versatile Disk), and reproducing a disk in which the program was recorded through the use of a drive apparatus which is not shown in the figure. It is also possible to supply a program and data to the video recorder 1 by use of the digital data IF control part 16. It is also conceivable to connect a drive apparatus to the digital data IF control part 16. Furthermore, another communication unit, which can communicate with an external network such as the Internet, may be disposed in the video recorder 1 to download a program and data from the external network.

A timer 21 measures the current time. In addition, a predetermined time may be set in the timer 21, and when the set time comes, it is possible to output a predetermined trigger signal from the timer 21 to CPU 17.

An operation part 19 has various kinds of buttons, switches and a simple display device disposed thereon, and provides a UI for the purpose of a user operating the video recorder 1. A user operates various kinds of buttons and switches of the operation part 19 by referring to a display, etc. on the display device, and carries out a channel selection instruction to a tuner, an instruction to record a received broadcast program to the recording medium 10, an instruction to reproduce the AV data 100, 100, . . . which are recorded in the recording medium 10, and so on. In addition, it is also possible to use the operation part 19 to carry out an instruction of programmed picture recording by use of the timer 21.

The reproducing terminal apparatus 2 has a communication unit (not shown in the figure) which can communicate with the digital data IF control part 16 to receive the AV data 101 transferred from the video recorder 1 by its communication unit, and then stores the received data to an incorporated storage medium 20. As the storage medium 20, it is possible to use, for example, a small size HDD or a non-volatile semiconductor memory, etc. In addition, the reproducing terminal apparatus 2 has a decoding unit which decodes the AV data 101 read out from the storage medium 20, a display unit which is used as a display element, such as an LCD (Liquid Crystal Display), and an audio output unit which amplifies analog audio signals and outputs them to a speaker or a headphone, and which is designed to reproduce the AV data 101 from the storage medium 20 for listening and viewing.

The video recorder 1 according to this embodiment of the invention has the two systems of the decoding part 12 and the decoding part 14 as a decoding unit for decoding the AV data 100 which was recorded in the recording medium 10, i.e., the MPEG TS. Accordingly, the video recorder 1 can carry out processing to read out the AV data 100 recorded in the recording medium 10 so that it may be listened to and viewed through the use of the monitor device 3, and conversion processing of other AV data 100 recorded in the recording medium 10 into AV data 101.

For example, AV data 100 to be viewed and listened to, and other AV data 100 to be converted into AV data 101, are to be read out from the recording medium 10 in a time-division manner. At this time, at least the AV data 100 to be viewed and listened to is read out from the recording medium 10 for a shorter time than the actual reproduction time of the data which was read out, and is decompressed to the actual time at the time of decoding. Meanwhile, the other AV data 100 to be converted into AV data 101 does not need to be reproduced in actual time, and therefore, it may be read out at a low speed.

In addition, in the reproducing terminal apparatus 2, there is no need for the storing speed of the transferred AV data 101 to the storage medium 20 to be of real time relative to a time axis of reproducing the AV data 101, and therefore, the transfer speed of the AV data 101 to be transferred through the digital data IF control part 16 is not particularly limited. For example, the transfer speed may be slow to some extent. If the transfer speed is slow, a long time is required until the transfer is complete, but it is possible to lessen the burden on the recording medium 10.

Further, the digital data interface which connects the video recorder 1 and the reproducing terminal apparatus 2 is not particularly limited. It is possible to connect the video recorder 1 and the reproducing terminal apparatus 2 by use of, for example, a USB (Universal Serial Bus), an IEEE (Institute Electrical and Electronics Engineering) 1394, etc. Furthermore, connection is not limited to wired communication, it being possible to connect the video recorder 1 and the reproducing terminal apparatus 2 by wireless communication. For example, it is possible to use a wireless communication standard referred to as Bluetooth.

Furthermore, in the embodiment of the invention, for the purpose of transferring the AV data 100 recorded in the recording medium 10 to the reproducing terminal apparatus 2, the AV data 100 may be decoded in the decoding part 14, and an output of the decoding part 14 may be encoded again in the encoding part 15. Accordingly, even if the video recorder 1 and the reproducing terminal apparatus 2 are different from each other in their reproduceable AV data formats and their recording bit rates, the transfer of AV data is still possible.

In the configuration described above, when AV data 100, which is based on received digital television broadcast signals, is recorded in the recording medium 10, a preference level is obtained by CPU 17 as to a broadcast program which corresponds to the AV data 100. The preference level is obtained by carrying out weighting for a key word included in content descriptive data, which is meta data of the broadcast program, based on a viewing and listening history. In addition, it is also possible to carry out weighting for a key word to obtain the preference level by designating the key word that a user believes is consistent with his or her preference. As a matter of course, these two methods may be used at the same time. The value of a key word which corresponds to the AV data 100 recorded in the recording medium 10 is given to the meta data of the AV data 100 as a preference level.

As already described schematically, in the embodiment of the invention, AV data 100, which was recorded in the recording medium 10, is converted into AV data 101 through the processing of the decoding part 14 and the encoding part 15, and is recorded in the recording medium 10. Further, AV data 101, which was recorded in the recording medium 10, is transferred to the reproducing terminal apparatus 2 through the digital I/F control part 16. Hereinafter, these processes will now be described in more detail.

Firstly, the process of converting AV data 100 into AV data 101 will be described by use of the flow chart of FIG. 3. Prior to the process shown in this flow chart, a user has designated in advance AV data 100 which he wishes to transfer to the reproducing terminal apparatus 2 out of the AV data 100, 100, . . . recorded in the recording medium 10 by use of the UI in the operation part 19. The designated content is stored in the memory 18 as a list (referred to as list A). In step S10, the list A is obtained by CPU 17.

FIG. 4 shows one example of the list A. An identifying ID is given to each of AV data 100, 100, . . . . In the example of FIG. 4, it is understood that three portions or programs of AV data 100 with ID="00005", ID="00020", and ID="00007" are requested to be transferred by a user. The preference level is shown by, for example, "1" through "10", and the larger a numerical value is, the higher the preference level is. A conversion flag shows whether the AV data 100 has already been converted into AV data 101. For example, if a value is "0", it means not yet converted, and if the value is "1", it means already converted. The conversion flag is given as, for example, meta data of the corresponding AV data 100, 100, . . . .

In a next step S11, a list (referred to as list B) is prepared of AV data 100 which is of a high preference level and which has not yet been converted. FIG. 5 shows one example of the list B. The items of the list B are to be identical to those of the list A. In this example of FIG. 5, the preference level is of a value of 5 or more, which means that the preference level is high, and two programs of AV data 100 with ID="00114" and ID="03521" are of a high preference level and have not yet been converted. The prepared list B is stored in the memory 18.

In step S12, the lists A and B are merged and sorted, so that a list C is prepared. The sort process is carried out, for example, in the order of (1) data which a user requested to be transferred, and (2) data which is of a high preference level. FIG. 6 shows one example of the list C which was prepared in this manner. The prepared list C is stored in the memory 18.

When the list C is prepared, the conversion of AV data 100, 100, . . . is started in accordance with the order of the list C. In step S13, it is determined whether conversion and recording of all of the programs of AV data 100 which are included in the list C have been completed. If it is determined that there is data which has not yet been converted, the AV data 100 which has not yet been converted is converted in a next step S14. For example, AV data 100 with ID="00020" is read out from the recording medium 10, supplied to and decoded in the decoding part 14, and converted into an analog AV signal. This analog AV signal is supplied to the encoding part 15 and encode processed by a system that the reproducing terminal apparatus 2 can reproduce, and is then recorded in the recording medium 10 as AV data 101.

At this time, as to the programs of AV data 100 which have been converted, a conversion flag, which is given to the list C and the meta data of the AV data 100, is changed from "0" to "1". After conversion processing of one program of AV data 100 has been completed, processing is returned again to step S13. If all conversion flags of the list C become a value ("1") which shows already-converted, the conversion process is completed.

This embodiment of the invention has the two systems of the decoding part 14 and the decoding part 12 as a unit which decodes the AV data 100 read out from the recording medium 10. Accordingly, even during the conversion process of FIG. 3 which uses the decoding part 14, it is possible to listen to and view the AV data 100 recorded in the recording medium 10 using the decoding part 12.

Meanwhile, in the foregoing, both the AV data 100 which was designated by a user and the AV data 100 which is of a high preference level and which has not yet been converted are converted into AV data 101, but the invention is not limited to this example. It is also possible to limit the data to be converted to, for example, only the AV data 100 which was designated by a user.

Figure 3:
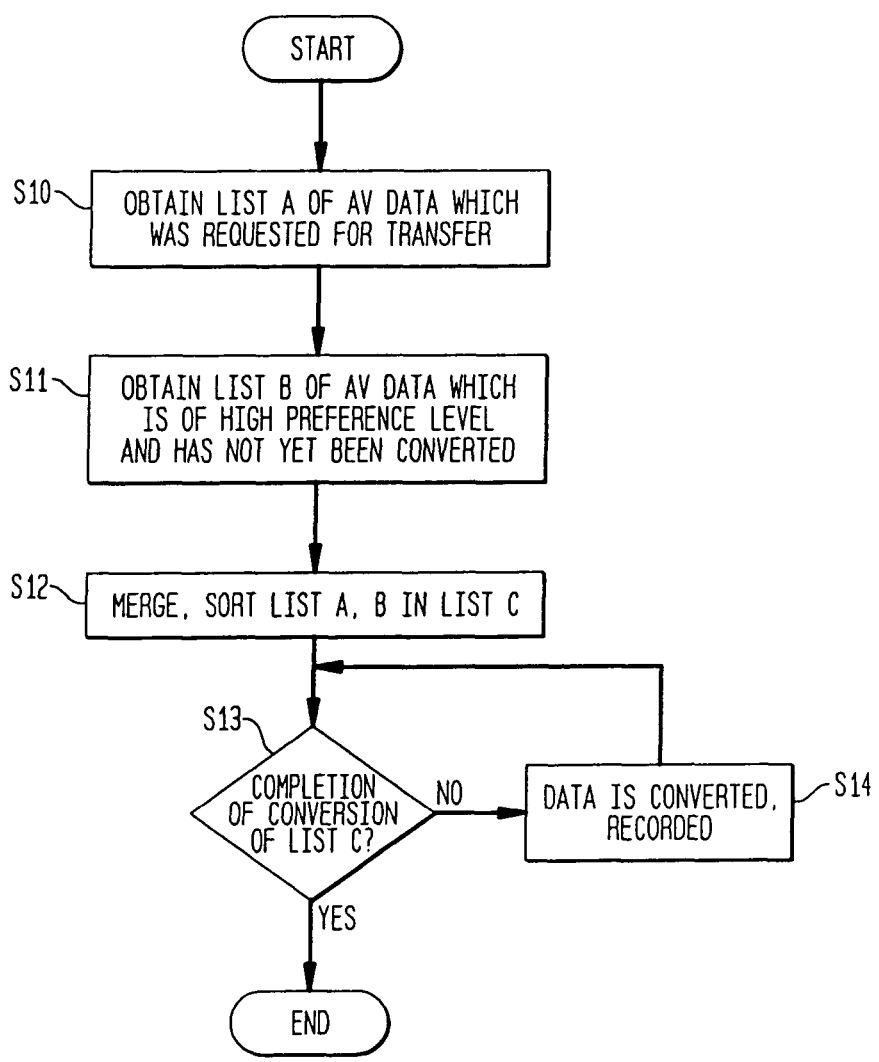
FIG. 3 is a flow chart which shows one example of a process of converting AV data.
Figure 7:
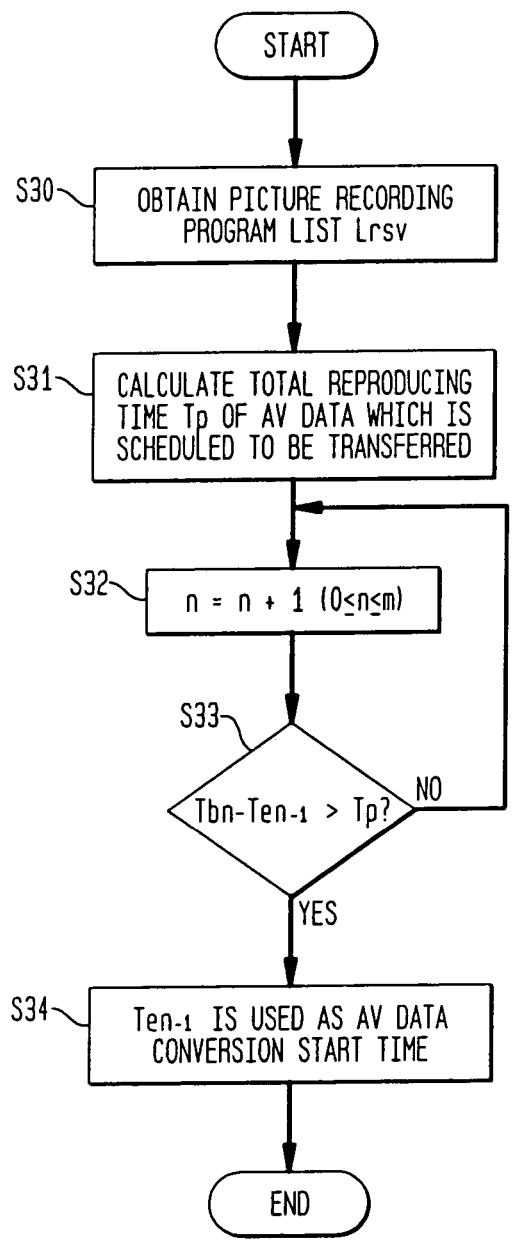
FIG. 7 is a flow chart which shows one example of a calculation process which determines the time for activating a conversion process.

As to the time for activating the above-described conversion process shown in FIG. 3, if it is carried out during a time period in which programmed picture recording is not taking place in the video recorder 1, accesses to the recording medium 10 are dispersed, which is more preferable. FIG. 7 shows an example of an algorithm which determines the time for activating the conversion process of FIG. 3. By this algorithm, the activation of the conversion process is scheduled. In step S30, a picture recording program list Lrsv is obtained by CPU 17. FIG. 8 shows one example of the picture recording program list Lrsv. As shown, the picture recording program list Lrsv is composed of a set of start times Tbm and ending times Tem of programmed picture recording. The picture recording program list Lrsv is stored in, for example, the memory 18.

In a next step S31, the list C, which was prepared in step S12 of FIG. 3 and stored in the memory 18, is referred to, and the total reproducing time Tp is calculated for AV data 100, 100, . . . which are scheduled to be transferred. In this case, the total reproducing time Tp refers to the time which is required for decoding AV data 100, 100, . . . , which were read out from the recording medium 10 on the basis of the list C, in the decoding part 14, for encoding it in the encoding part 15, and for recording it in the recording medium 10. It is possible to estimate the total reproducing time Tp from, for example, the data capacity of AV data 100, 100, . . . on the list C. In addition, when the decode processing in the decoding part 14 is to be carried out during the actual reproducing time, if the recording time of the AV data is recorded in a viewing and listening history, it is possible to obtain the total reproducing time Tp by referring to the viewing and listening history on the basis of the ID of each program of AV data 100, 100, . . . .

In a loop which is composed of the next steps S32 and S33, on the basis of the picture recording program list Lrsv, it is determined whether the time from the completion of picture recording until the start of the next picture recording is longer than the total reproducing time Tp. In step S32, a counter value n is counted up one by one with respect to each loop from 0 as an initial value to a program picture recording number m which is based on the picture recording program list Lrsv. In step S33, a process is carried out for each loop to obtain the difference between the n-th programmed picture recording start time Tbn and the (n−1)-th programmed picture recording ending time Ten-1 and to compare it with the total reproducing time Tp. As a result of the comparison, if Tbn−Ten−1>Tp is realized, the process is shifted to step S34, passing through the loop, and the programmed picture recording ending time Ten−1 satisfying Tbn−Ten−1>Tp is used as the start time of the conversion process shown in FIG. 3.

The programmed picture recording ending time Ten−1, which was obtained in this manner, is set in the timer 21. When the timer 21 detects that it is the time Ten−1, the timer 21 outputs a trigger signal to CPU 17. CPU 17 receives this trigger signal and starts the conversion processing of AV data 100 as described by the use of FIG. 3.

Meanwhile, it is conceivable that Tbn−Ten−1>Tp cannot be satisfied. In this case, for example, it is possible to display a warning notice to this effect on a display device disposed in the operation part 19. Not being limited to this, it is possible, for example, to configure the system so that the processing of step S31 and the subsequent steps in FIG. 7 are carried out in sequence, while reducing the data to be scheduled for transfer one by one from the bottom of the list C, to obtain the start time of the conversion processing. In addition, after limiting to data on the list C which was designated by a user, the processing of step S31 and the subsequent steps in FIG. 7 may be carried out again to obtain the start time of the conversion processing. Further, not being limited to the foregoing, the conversion process may be carried out by dispersing it over a plurality of free times.

Furthermore, if the bit rate during actual processing, i.e., the sum of recording programmed pictures, reading AV data 100 from the recording medium 10 and recording converted AV data 101 to the recording medium 10, is lower than the bit rate which is allowed in the recording medium 10, it is possible to activate the conversion process of FIG. 3 at an arbitrary time. In this case, it is possible to omit the calculation by the above-described algorithm of FIG. 7. Further, it is also possible for a user to call for the start of the conversion process in FIG. 3 by use of the UI of the video recorder 1, without automatically activating the conversion process.

Figure 9:
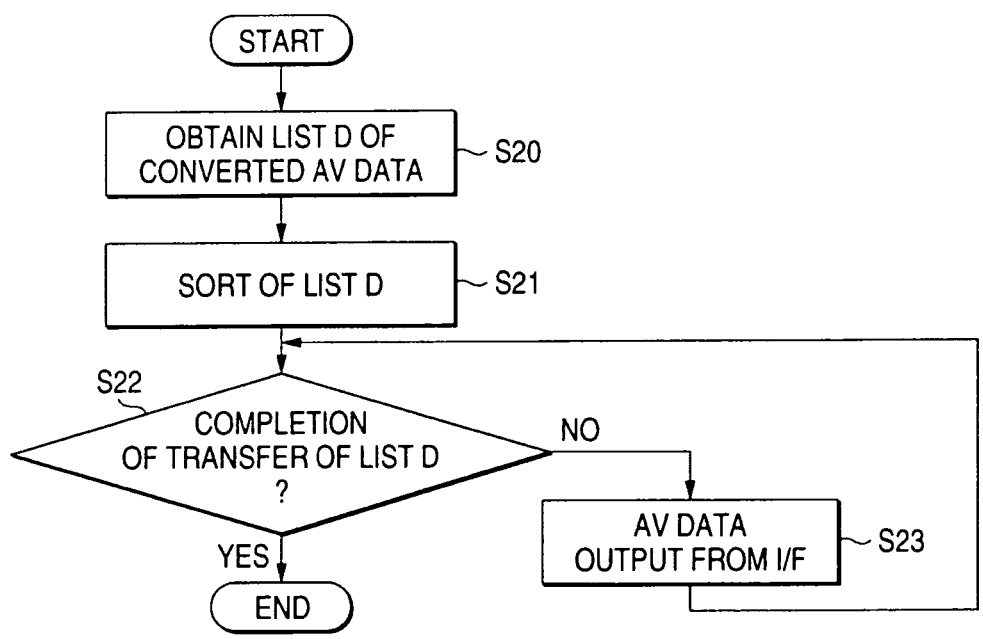
FIG. 9 is a flow chart which shows one example of a process which transfers converted AV data, which was recorded in a recording medium, to a reproducing terminal apparatus through a digital data IF control part.

FIG. 9 shows one example of a process for transferring AV data 101, which was converted in accordance with the above-described process of FIG. 3 and recorded in the recording medium 10, to the reproducing terminal apparatus 2 through the digital data IF control part 16. Prior to the process of FIG. 9, the digital data IF control part 16 detects whether the reproducing terminal apparatus 2 is connected to the digital data IF control part 16. For example, in the digital data IF control part 16, if communication with the reproducing terminal apparatus 2 is tried at regular intervals and there is a response, connection with the reproducing terminal apparatus 2 is detected. If the reproducing terminal apparatus 2 is not detected, the process of FIG. 9 is not carried out.

If it is detected that the reproducing terminal apparatus 2 is connected to the digital data IF control part 16, the transfer process from step S20 is started. Therefore, if there is converted AV data 101 on the recording medium 10, it is possible to start the transfer process from the time at which the reproducing terminal apparatus 2 was connected to the digital data IF control part 16. It is also possible to start the transfer process during a period of conversion of AV data 100 to AV data 101 on the basis of the list C.

In step S20, a list (referred to as list D) of the converted AV data 101 is obtained. The list D can be obtained from the list C after the above-described process of FIG. 3. When the list D is obtained, the list D is sorted in a next step S21. The sorting process is carried out in the order of, for example, (1) data which a user requested to be transferred, and (2) data which is of a high preference level.

In the next steps S22 and S23, AV data 101, 101, . . . , which are described in the list D, are transferred to the reproducing terminal apparatus 2. AV data 101, 101, . . . are read out in sequence from the recording medium 10 in accordance with the order of the list D, and are supplied to the digital data IF control part 16. In the digital data IF control part 16, while an exchange of predetermined communication protocol is carried out with the reproducing terminal apparatus 2, the supplied AV data 101, 101, . . . are transferred to the reproducing terminal apparatus 2. In the reproducing terminal apparatus 2, the transferred AV data 101, 101, . . . are stored in the storage medium 20. When the transfer of all of the AV data 101, 101, . . . described in the list D has been completed, a series of transfer processing is completed.

The transfer of AV data 101 can be carried out in parallel with another access to the recording medium 10. The AV data 101 is converted in advance and recorded in the recording medium 10, and therefore the transfer speed may be slow. Therefore, for example, it is possible to configure the system so that the decoding part 14 accesses the recording medium 10 and reads out the AV data 101 during the free time between accesses to the recording medium 10 by the decoding part 12, which is generated by the decoding time and buffering time, etc. in the decoding part 12, when AV data 100 is read out from the recording medium 10 for the purpose of viewing and listening.

Meanwhile, in the foregoing, the digital data IF control part 16 has a function of detecting whether there is a connection with the reproducing terminal apparatus 2, but the functions of the digital data IF control part 16 are not limited to this example, and even if the digital data IF control part 16 does not have a function of detecting a connection with the reproducing terminal apparatus 2, it is possible to carry out the process of transferring data in the same manner. In this case, for example, a UI for instructing the start of the transfer of AV data 101, 101, . . . is disposed in the operation part 19. After a user connects the reproducing terminal apparatus 2 to the digital data IF control part 16, this UI is operated, and thereby, the process of transferring AV data 101, 101, . . . from the video recorder 1 to the reproducing terminal apparatus 2 is started.

Figure 10:
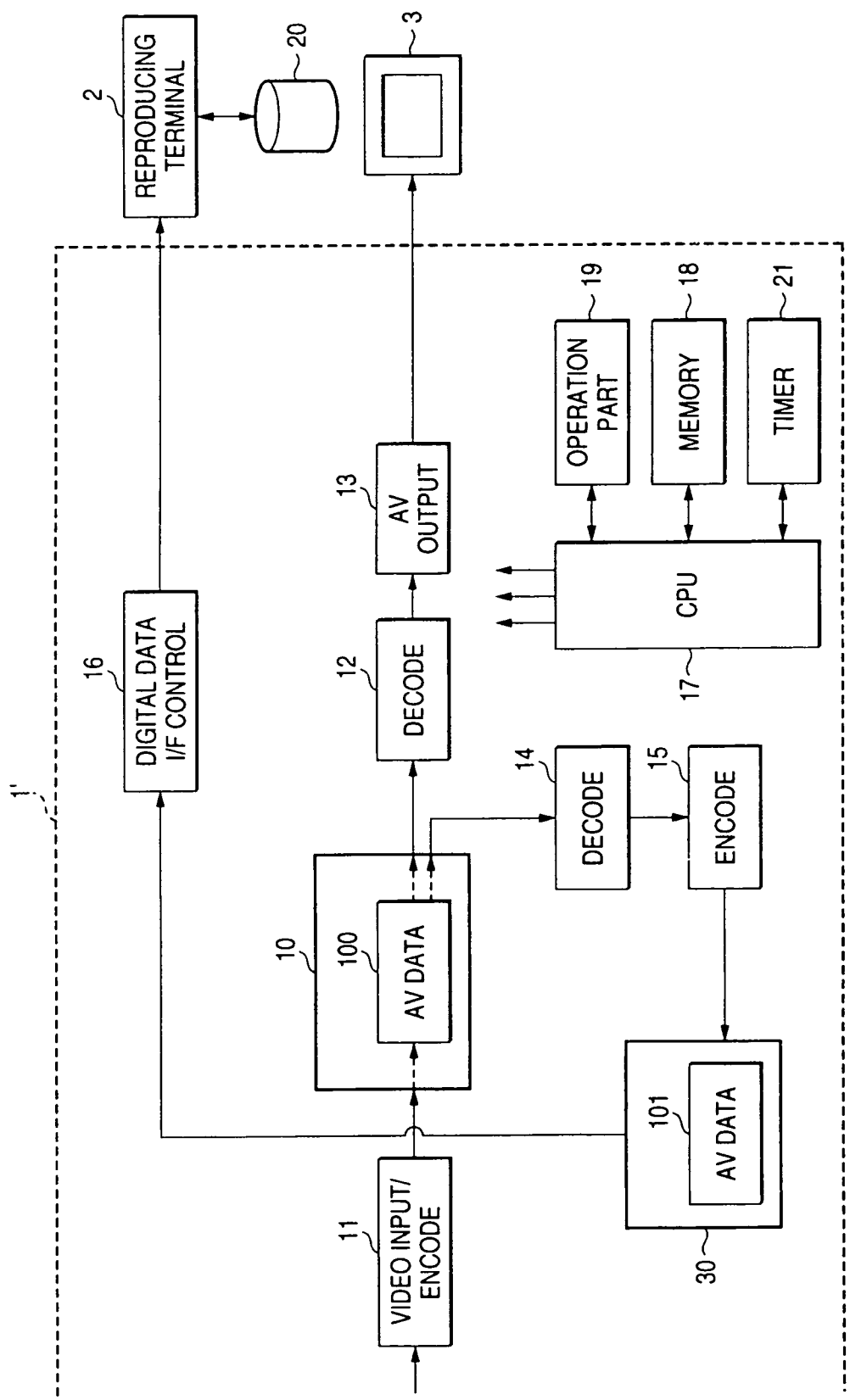
FIG. 10 is a block diagram which shows the configuration of one example of a video recorder according to a modified example of the embodiment of the invention.

Next, a modified example of this embodiment of the invention will be described with reference to the drawings. FIG. 10 shows the configuration of one example of the video recorder 1' according to this modified embodiment of the invention. In FIG. 10, identical reference numerals and signs are given to elements which are common to the above-described FIG. 2, and detailed explanations thereof are omitted.

This modified example of the embodiment is designed so that an AV data buffer 30 is connected to the output of the encoding part 15, and the output of the AV data buffer 30 is supplied to the digital data IF control part 16. That is, AV data 101, which was encode processed by the encoding part 15, is stored in the AV data buffer 30 and then supplied to the digital data IF control part 16. Therefore, in this modified example of the embodiment, the conversion of AV data 100 and the transfer of the converted AV data 100 are carried out as a series of processes. A semiconductor memory may be used as the AV data buffer 30. It is also possible to use a partial region of the recording medium 10 as the AV data buffer 30.

FIG. 11 shows an example of a process for carrying out the conversion and transfer of AV data 100 according to this modified embodiment. In FIG. 11, identical reference numerals and signs are given to process steps which are common to the above-described FIG. 3, and a detailed explanation of same is omitted.

Prior to the process shown in this flow chart, a user designates in advance AV data 100 which the user wishes to transfer to the reproducing terminal apparatus 2 from among the AV data 100, 100, . . . recorded in the recording medium 10 by use of a UI which is not shown in the figure. In addition, the digital data IF control part 16 detects whether the reproducing terminal apparatus 2 is connected to the digital data IF control part 16. If there is no connection, the process in this FIG. 11 is not carried out.

Meanwhile, even when the digital data IF control part 16 does not have the function of detecting the connection with the reproducing terminal apparatus 2, it is possible to start the process described below, as already described in one embodiment of the invention, by providing a UI in the operation part 19 for instructing the start of transfer of AV data 101, 101, . . . and by a user operating this UI to send such an instruction.

If data to be transferred is specified and the connection of the reproducing terminal apparatus 2 to the digital data IF control part 16 is detected, the process is started from step S10. In step S10, a list (list A) of AV data 100, which a user requested to be transferred, is obtained by CPU 17. In a next step S11, a list (list B) is prepared of AV data 100 which is of a high preference level and which has not yet been converted. In step S12, the lists A and B are merged and sorted to produce a list C. The sort process is carried out, for example, in the order of (1) data which a user requested to be transferred, and (2) data which is of a high preference level.

When the list C is prepared, the conversion of AV data 100, 100, . . . is started in accordance with the order of the list C. In step S13, it is determined whether conversion and recording of all AV data 100 included in the list C have been completed. If it is determined that there is data which has not yet been converted, the process is shifted to a next step S14'. In step S14', AV data 100 which has not yet been converted is converted into predetermined data by the decoding part 14 and the encoding part 15, and is used as AV data 101, and the converted AV data 101 is stored in the AV data buffer 30. At this time, as to AV data 100 which has been converted, a conversion flag, which is given to the list C and the meta data of the AV data 100, is changed from "0" to "1".

In a next step S15, the stored AV data 101 is read out from the AV data buffer 30 and supplied to the digital data IF control part 16. The digital data IF control part 16 transfers the supplied AV data 101 to the reproducing terminal apparatus 2. Then, the process is returned to step S13. The conversion processing of AV data 100 and the transfer processing of the converted AV data 101 are controlled so as not to overflow the AV data buffer 30.

This modified embodiment of the invention also has the two systems of the decoding part 14 and the decoding part 12 as a unit which decodes the AV data 100 read out from the recording medium 10, and therefore, it is possible to carry out the conversion of AV data 100 into AV data 101 and to transfer it to the reproducing terminal apparatus 2 in a parallel manner while viewing and listening to the AV data 100 recorded in the recording medium 10 on the monitor device 3.

The embodiment and the modified embodiment of the invention may be configured so as to convert AV data 100 which was designated by a user and AV data 100 which is of a high preference level and which has not yet been converted, into AV data 101, but the invention is not limited to this, and it is possible to limit the data to be converted to only, for example, the AV data 100 which was designated by a user.

In addition, the above-described embodiment and the modified embodiment of the invention may be configured in such a manner that, when the digital data IF control part 16 has the function of detecting the connection to the reproducing terminal apparatus 2, the process of transferring the AV data 101 is started based on a determination of whether the reproducing terminal apparatus 2 is or is not connected, and when the digital data IF control part 16 does not have the function of detecting the connection to the reproducing terminal apparatus 2, a user instructs the start of transfer by use of a UI, but the invention is not limited to this example. For example, even when the digital data IF control part 16 has the function of detecting the connection to the reproducing terminal apparatus 2, the system may be designed so that a user can input an instruction to start transfer by use of a UI.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A data recording apparatus configured to transfer AV data recorded in a recording medium to another apparatus, said data recording apparatus comprising:

first and second decoding units operable to decode AV data read out from the recording medium;

an encoding unit operable to encode the AV data decoded by the second decoding unit;

a communication unit operable to transfer the encoded AV data to the another apparatus, both decoding units being used to decode AV data that is compression-encoded digital data which is stored in the recording medium, the output of the encoding unit being encoded AV data of a standard format that is different from a standard format of the data read out from the recording medium by the first and second decoding units, the standard formats differing from one another by more than just their bit rates, and the standard format of the encoding unit output being selectable, the first and second decoding units and the encoding unit are operable simultaneously such that the data recording apparatus may use the encoding unit to encode data from the recording medium and transfer the encoded data to the another apparatus while at the same time using the first decoding unit to decode data from the recording medium and transfer the decoded data to a third apparatus, the first and second decoding units being units which decode data of the same type, wherein the encoded AV data is recorded in the recording medium and is read out from the recording medium when transferred to the another apparatus, and wherein the decoding of the AV data read out from the recording medium by the second decoding unit and the encoding of the decoded data by the encoding unit are carried out based on a list designating AV data whose transfer has been requested; and a preference level calculating unit operable to calculate a preference level for each program of AV data recorded by a user in the recording medium, the calculation of a preference level for a program comprising weighting a keyword included in content descriptive data corresponding to the program, wherein the list includes both programs for which a user has requested transfer to the another apparatus and programs for which the user has not requested transfer to the another apparatus, the programs which are included in the list, and for which the user has not requested transfer, being included in the list based on their respective preference levels, and wherein the list is sorted such that the programs in the list for which transfer has not been requested are automatically decoded by the second decoding unit after decoding by the second decoding unit of programs in the list for which transfer has been requested.

2. The data recording apparatus as set forth in claim 1, wherein the encoding unit is operable to encode the decoded AV data to a format which can be reproduced by the another apparatus.

3. The data recording apparatus as set forth in claim 1, wherein the communication unit is operable to detect whether communication with the another apparatus is possible, and to automatically start the transfer of the encoded AV data when it is determined that communication with the another apparatus is possible.

4. The data recording apparatus as set forth in claim 1, further comprising:
an input unit operable to designate the AV data to be transferred from among AV data recorded by a user in the recording medium,
wherein the list is based on designation by the input unit.

5. The data recording apparatus as set forth in claim 1, wherein the preference level calculating unit calculates the preference levels by carrying out a weighting process based on a viewing and listening history for a key word included in meta data of the AV data.

6. The data recording apparatus as set forth in claim 1, wherein the preference level calculating unit calculates the preference levels by carrying out a weighting process for a key word designated by a user.

7. The data recording apparatus as set forth in claim 1, wherein the reading of the AV data from the recording medium, the decoding of the read out AV data, the encoding of the decoded AV data, and the recording of the encoded AV data in the recording medium are carried out in accordance with a schedule formulated on the basis of the list.

8. The data recording apparatus as set forth in claim 7, wherein the schedule is formulated based on a time period in which AV data is programmed to be recorded in the recording medium and a total reproducing time of the AV data designated in the list.

9. The data recording apparatus as set forth in claim 1, further comprising:
a buffer unit operable to temporarily store AV data, wherein the encoded AV data is supplied to the communication unit through the buffer unit for transfer to the another apparatus.

10. The data recording apparatus as set forth in claim 9, wherein the decoding of the AV data read out from the recording medium and the encoding of the decoded AV data are carried out based on a list designating the AV data whose transfer has been requested.

11. The data recording apparatus as set forth in claim 10, further comprising:
an input unit operable to designate the AV data to be transferred from among the AV data recorded by a user in the recording medium,
wherein the list is based on designation by the input unit.

12. The data recording apparatus as set forth in claim 10, further comprising:
a preference level calculating unit operable to calculate a preference level for each program of the AV data recorded in the recording medium,
wherein the list is based on the preference levels calculated by the preference level calculating unit.

13. A method for transferring AV data recorded in a recording medium of a data recording apparatus to another apparatus, said method comprising:
reading out first AV data from a recording medium and decoding the read out first AV data using a first decoding unit;
reading out second AV data from the recording medium and decoding the read out second AV data using a second decoding unit;
encoding, through use of an encoding unit, the AV data decoded by the second decoding unit;
transferring the encoded AV data to the another apparatus, both decoding units being used to decode AV data that is compression-encoded digital data which is stored in the recording medium,
the output of the encoding step being encoded AV data of a standard format that is different from a standard format of the data read out from the recording medium by the first and second decoding units, the standard formats differing from one another by more than just their bit rates, and the standard format of the encoding step output being selectable,
the first and second decoding units and the encoding unit are operable simultaneously such that the data recording apparatus may use the encoding unit to encode data from the recording medium and transfer the encoded data to the another apparatus while at the same time using the first decoding unit to decode data from the recording medium and transfer the decoded data to a third apparatus, the first and second decoding units being units which decode data of the same type,
wherein the encoded AV data is recorded in the recording medium and is read out from the recording medium when transferred to the another apparatus, and
wherein the decoding of the AV data read out from the recording medium by the second decoding unit and the encoding of the decoded data by the encoding unit are carried out based on a list designating AV data whose transfer has been requested; and
calculating a preference level for each program of AV data recorded by a user in the recording medium, the calculation of a preference level for a program comprising weighting a keyword included in content descriptive data corresponding to the program, wherein the list includes both programs for which a user has requested transfer to the another apparatus and programs for which the user has not requested transfer to the another apparatus, the programs which are included in the list, and for which the user has not requested transfer, being included in the list based on their respective preference levels, and wherein the list is sorted such that the programs in the list for which transfer has not been requested are automatically decoded by the second decoding unit after decoding by the second decoding unit of programs in the list for which transfer has been requested.

14. A system for transferring AV data recorded in a recording medium of a data recording apparatus to another apparatus, said system comprising:

a processor operable to execute instructions; and instructions for causing the processor to perform a data transfer method, the data transfer method including:

reading out first AV data from a recording medium and decoding the read out first AV data using a first decoding unit;

reading out second AV data from the recording medium and decoding the read out second AV data using a second decoding unit;

encoding, using an encoding unit, the AV data decoded by the second decoding unit;

transferring the encoded AV data to the another apparatus, both decoding units being used to decode AV data that is compression-encoded digital data which is stored in the recording medium, the output of the encoding step being encoded AV data of a standard format that is different from a standard format of the data read out from the recording medium by the first and second decoding units, the standard formats differing from one another by more than just their bit rates, and the standard format of the encoding step output being selectable, the first and second decoding units and the encoding unit are operable simultaneously such that the data recording apparatus may use the encoding unit to encode data from the recording medium and transfer the encoded data to the another apparatus while at the same time using the first decoding unit to decode data from the recording medium and transfer the decoded data to a third apparatus, the first and second decoding units being units which decode data of the same type, wherein the encoded AV data is recorded in the recording medium and is read out from the recording medium when transferred to the another apparatus, and wherein the decoding of the AV data read out from the recording medium by the second decoding unit and the encoding of the decoded data by the encoding unit are carried out based on a list designating AV data whose transfer has been requested; and calculating a preference level for each program of AV data recorded by a user in the recording medium, the calculation of a preference level for a program comprising weighting a keyword included in content descriptive data corresponding to the program, wherein the list includes both programs for which a user has requested transfer to the another apparatus and programs for which the user has not requested transfer to the another apparatus, the programs which are included in the list, and for which the user has not requested transfer, being included in the list based on their respective preference levels, and wherein the list is sorted such that the programs in the list for which transfer has not been requested are automatically decoded by the second decoding unit after decoding by the second decoding unit of programs in the list for which transfer has been requested.

15. A non-transitory recording medium recorded with a program for causing a computer to execute a method for transferring AV data recorded in a recording medium of a data recording apparatus to another apparatus, said method comprising:

reading out first AV data from a recording medium and decoding the read out first AV data using a first decoding unit;

reading out second AV data from the recording medium and decoding the read out second AV data using a second decoding unit;

encoding, using an encoding unit, the AV data decoded by the second decoding unit; and transferring the encoded AV data to the another apparatus, both decoding units being used to decode AV data that is compression-encoded digital data which is stored in the recording medium, the output of the encoding step being encoded AV data of a standard format that is different from a standard format of the data read out from the recording medium by the first and second decoding units, the standard formats differing from one another by more than just their bit rates, and the standard format of the encoding step output being selectable, the first and second decoding units and the encoding unit are operable simultaneously such that the data recording apparatus may use the encoding unit to encode data from the recording medium and transfer the encoded data to the another apparatus while at the same time using the first decoding unit to decode data from the recording medium and transfer the decoded data to a third apparatus, the first and second decoding units being units which decode data of the same type, wherein the encoded AV data is recorded in the recording medium and is read out from the recording medium when transferred to the another apparatus, and wherein the decoding of the AV data read out from the recording medium by the second decoding unit and the encoding of the decoded data by the encoding unit are carried out based on a list designating AV data whose transfer has been requested; and calculating a preference level for each program of AV data recorded by a user in the recording medium, the calculation of a preference level for a program comprising weighting a keyword included in content descriptive data corresponding to the program, wherein the list includes both programs for which a user has requested transfer to the another apparatus and programs for which the user has not requested transfer to the another apparatus, the programs which are included in the list, and for which the user has not requested transfer, being included in the list based on their respective preference levels, and wherein the list is sorted such that the programs in the list for which transfer has not been requested are automatically decoded by the second decoding unit after decoding by the second decoding unit of programs in the list for which transfer has been requested.

16. A system for transferring AV data recorded in a recording medium to another apparatus, said system comprising:
a data recording apparatus; and
a data reproducing apparatus;
the data recording apparatus including:
    first and second decoding units operable to decode AV data read out from the recording medium,
    an encoding unit operable to encode the AV data decoded by the second decoding unit, and
    a first communication unit operable to carry out communication with another apparatus; and
the data reproducing apparatus including:
    a second communication unit operable to communicate with the first communication unit,
    a storage unit operable to store AV data, and
    a third decoding unit operable to decode AV data read out from the storage unit,
    wherein the first communication unit of the data recording apparatus transfers the encoded AV data to the data reproducing apparatus, and the second communication unit of the data reproducing apparatus receives the transferred AV data and stores the transferred AV data in the storage unit,
    both the first and second decoding units being used to decode AV data that is compression-encoded digital data which is stored in the recording medium,
    the output of the encoding unit being encoded AV data of a standard format that is different from a standard format of the data read out from the recording medium by the first and second decoding units, the standard formats differing from one another by more than just their bit rates, and the standard format of the encoding unit output being selectable,
    the first and second decoding units and the encoding unit are operable simultaneously such that the data recording apparatus may use the encoding unit to encode data from the recording medium and transfer the encoded data to the another apparatus while at the same time using the first decoding unit to decode data from the recording medium and transfer the decoded data to a third apparatus, the first and second decoding units being units which decode data of the same type,
    wherein the encoded AV data is recorded in the recording medium and is read out from the recording medium when transferred to the another apparatus,
    wherein the decoding of the AV data read out from the recording medium by the second decoding unit and the encoding of the decoded data by the encoding unit are carried out based on a list designating AV data whose transfer has been requested,
    wherein the data recording apparatus further comprises a preference level calculating unit operable to calculate a preference level for each program of AV data recorded by a user in the recording medium, the calculation of a preference level for a program comprising weighting a keyword included in content descriptive data corresponding to the program, and
    wherein the list includes both programs for which a user has requested transfer to the another apparatus and programs for which the user has not requested transfer to the another apparatus, the programs which are included in the list, and for which the user has not requested transfer, being included in the list based on their respective preference levels, and
    wherein the list is sorted such that the programs in the list for which transfer has not been requested are automatically decoded by the second decoding unit after decoding by the second decoding unit of programs in the list for which transfer has been requested.

17. The data transfer system as set forth in claim 16, wherein the encoding unit is operable to encode the AV data decoded by the second decoding unit to a format which can be decoded by the third decoding unit.

18. The data transfer system as set forth in claim 16, wherein the first communication unit is operable to detect whether communication with the second communication unit is possible, and to automatically start the transfer of the encoded AV data when it is determined that communication with the second communication unit is possible.

19. The data transfer system as set forth in claim 16, wherein the data recording apparatus further includes:
    an input unit operable to designate the AV data to be transferred from among AV data recorded by a user in the recording medium, and
    the list is based on designation by the input unit.

20. The data transfer system as set forth in claim 16, wherein the preference level calculating unit calculates the preference levels by carrying out a weighting process based on a viewing and listening history for a key word included in meta data of the AV data.

21. The data transfer system as set forth in claim 16, wherein the preference level calculating unit calculates the preference levels by carrying out a weighting process for a key word designated by a user.

22. The data transfer system as set forth in claim 16, wherein the reading of the AV data from the recording medium, the decoding of the read AV data, the encoding of the decoded AV data, and the recording of the encoded AV data in the recording medium are carried out in accordance with a schedule formulated on the basis of the list.

23. The data transfer system as set forth in claim 22, wherein the schedule is formulated based on a time period in which AV data is programmed to be recorded in the recording medium and a total reproducing time of the AV data designated in the list.

24. The data transfer system as set forth in claim 16, wherein the data recording apparatus further includes:
    a buffer unit operable to temporarily store AV data, and
    the encoded AV data is supplied to the first communication unit through the buffer unit for transfer to the data reproducing apparatus.

25. The data transfer system as set forth in claim 24, wherein the decoding of the AV data read out from the recording medium and the encoding of the decoded AV data are carried out based on a list designating the AV data whose transfer has been requested.

26. The data transfer system as set forth in claim 25, wherein the data recording apparatus further includes:
    an input unit operable to designate the AV data to be transferred from among the AV data recorded in the recording medium, and
    the list is based on designation by the input unit.

27. The data transfer system as set forth in claim 25, wherein the data recording apparatus further includes:
    a preference level calculating unit operable to calculate a preference level for each program of the AV data recorded in the recording medium, and
    the list is based on the preference levels calculated by the preference level calculating unit.

* * * * *